United States Patent [19]

Premerlani

[11] Patent Number: 4,547,826
[45] Date of Patent: Oct. 15, 1985

[54] GENERALIZED REAL-TIME THERMAL MODEL

[75] Inventor: William J. Premerlani, Scotia, N.Y.
[73] Assignee: General Electric Company, Schenectady, N.Y.
[21] Appl. No.: 556,743
[22] Filed: Nov. 30, 1983
[51] Int. Cl.[4] .............................................. H02H 7/08
[52] U.S. Cl. ......................................... 361/25; 361/27; 361/103; 364/483; 364/557
[58] Field of Search ........................ 361/23, 24, 25, 26, 361/27, 28, 30, 31, 94, 95, 96, 97, 103, 106; 318/473, 798, 806, 471, 472; 364/483, 557; 340/648, 664

[56] References Cited

U.S. PATENT DOCUMENTS

| | | | |
|---|---|---|---|
| 3,573,555 | 4/1971 | Lipnitz | 361/94 |
| 4,000,410 | 12/1976 | Hentschel et al. | 361/31 |
| 4,286,303 | 8/1981 | Grenheimer et al. | 361/24 |
| 4,319,298 | 3/1982 | Davis et al. | 361/24 |
| 4,434,390 | 2/1984 | Elms | 361/24 X |

OTHER PUBLICATIONS

D. R. Boothman et al., "Thermal Tracking—A Rational Approach to Motor Protection", IEEE Technical Paper T 74 029-5 inclusive.
Motor Command by Westinghouse.
F. Shirzadi, "Electronics Improve Motor Protection", Design News, Jun. 6, 1983, pp. 135-138.

*Primary Examiner*—Harry E. Moose, Jr.
*Attorney, Agent, or Firm*—George B. Fox; James C. Davis, Jr.; Bernard J. Lacomis

[57] ABSTRACT

A generalized real-time thermal model of an induction motor produces values indicative of the transient and steady state temperature condition of the motor. Each of these values is compared with respective predetermined limits and power to the motor is removed when any value exceeds its respective limit in order to prevent damage to the motor.

14 Claims, 3 Drawing Figures

GENERALIZED REAL-TIME THERMAL MODEL

This invention relates to a thermal model for an induction motor and, more particularly, to a generalized real-time thermal model wherein the thermal model may be readily modified without hardware changes to accommodate motors having different numbers of and different sitings for temperature sensors.

Several devices are presently available for thermally protecting motors. The oldest and most common is a switch activated by a bimetallic strip having motor current passing therethrough. As current heats the bimetallic strip, the strip warps due to differential temperature expansion of the dissimilar metals comprising the strip. A motor control circuit coupled to the switch removes power to the motor when a predetermined temperature limit (as indicated by the extent of warping) is exceeded. There is thermal lag between the moment current through the bimetallic strip increases and warping of the bimetallic strip in response to the current increase occurs. Thus, a bimetallic strip does not adequately protect motors during unusual duty cycles, such as cyclic loading and large inertial loads, during which transient currents are likely to occur. Additionally, nuisance tripping, i.e. removing power to the motor before a temperature limit has been exceeded, may occur due to attempts to start motor shortly after continuous operation at full load has ceased.

On larger motors, temperature measurement devices, such as a resistance temperature detector (RTD) or a thermistor, i.e. semiconductor material whose resistance varies with temperature, may be imbedded in the stator windings. These devices also exhibit a thermal lag during duty cycles wherein transient currents are likely to occur since temperature measurement devices do not instantaneously respond to changes in winding temperature.

More recently, thermal models, such as is disclosed in the article "Thermal Tracking—A Rational Approach to Motor Protection"—Boothman et al., IEEE Power Engineering Society, have been used to try to account for the time lag of temperature measurement devices. Although these models provide a more accurate estimation of winding temperature than the aforementioned devices, they are generally not applicable to smaller induction motors which do not usually have temperature measuring devices imbedded in their windings, due in part to size constraints on the devices. These models also do not generally account for variation of heat exchange coefficients as a function of motor temperature and speed. Also, these models generally do not provide for the capability of motor windings to typically withstand temperatures, which are higher than steady-state maximum allowable temperatures, for short durations, without damaging the windings.

Further, although the aforementioned models typically provide a more accurate indication of motor temperature than a bimetallic strip or RTD, one model is not universally applicable to all motors. For example, different motors may have different sitings or lack certain sitings for temperature measurement devices within the motor; special motor designs, such as non- ventilated motors or unusual duty cycle motors may exist, all of which necessitate a different thermal model to accommodate the selected motor configuration.

Accordingly, one object of the present invention is to provide a method for simulating any real-time thermal model of a motor.

Another object is to provide a method for simulating a plurality of different real-time thermal models wherein different models may be simulated without need of hardware modifications.

Yet another object of the present invention is to provide an apparatus for simulating a real-time thermal model for a motor wherein the model may be readily changed to accommodate special applications of the motor.

Still another object is to provide thermal protection of inducation motors without inducing nuisance tripping.

A further object is to provide a method for motor thermal protection which accounts for a reduction in cooling when the motor is not running.

Yet a further object is to provide a method for motor thermal protection which can accommodate ambient and/or winding temperature measurements.

Still a further object is to provide a method for motor thermal protection which accounts for momentary overtemperature capability of motor windings.

BRIEF SUMMARY OF THE INVENTION

In accordance with the present invention, a generalized real-time thermal model of an induction motor produces values indicative of the transient and steady state temperature condition of the motor. The model may use an electrical analog of the motor wherein a capacitor represents a thermal capacity, a voltage source represents a known temperature and a resistor represents thermal resistance between two points or nodes. The model may be implemented in a microprocessor, wherein changes in values for electrical analog components may be readily made without having to make actual physical hardware changes. Values representative of transient and steady-state temperature condition of the motor are individually monitored and each value is compared respectively with a respective predetermined limit. Power to the motor is removed when any value monitored exceeds its respective predetermined limit.

The features of the invention believed to be novel are set forth with particularity in the appended claims. The invention itself, however, both as to organization and method of operation together with further objects and advantages thereof, may best be understood by reference to the detailed description taken in connection with the accompanying drawings.

DETAILED DESCRIPTION

Figure 1:
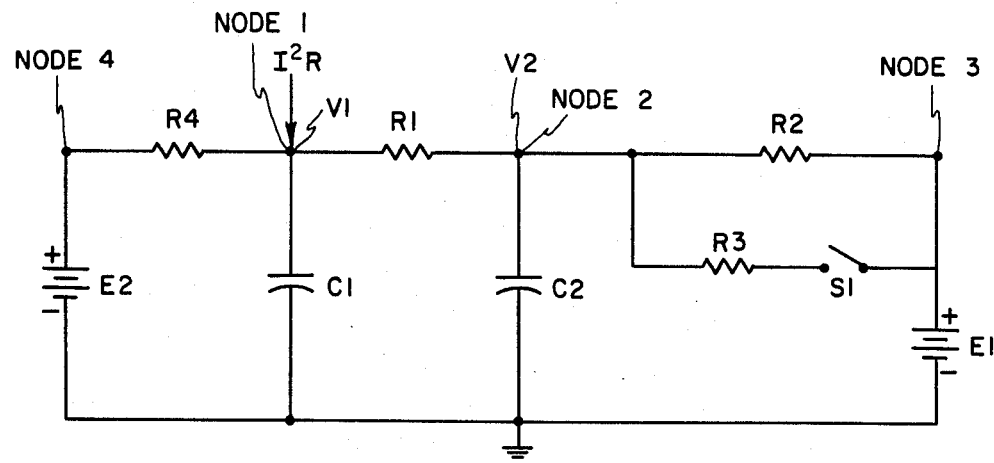
FIG. 1 is a thermal model of an induction motor shown as an electrical analog, and useful with the present invention.

Shown in FIG. 1 is an electrical analog model, in accordance with the present invention, of a thermal system of an induction motor wherein capacitors C1 and C2 represent heat storage elements (i.e. copper and iron, respectively), resistors R1, R2, R3 and R4 represent heat transfer resistances, $I^2R$ represents rate of heat generation, E1 represents ambient temperature input (in volts) and E2 represents winding temperature input (in volts) from a temperature sensing device, such as an RTD, imbedded in the motor windings. It is not necessary that the individual value of a specific capacitor or resistor be known, only that time constants, e.g., R1·C1; R2·C2; R4·C1; and R2 in parallel with R3 times C2, i.e. (R2·R3/R2+R3)·C2, be determinable.

One end of resistor R1 is connected to one side of capacitor C1 and the other side of capacitor C1 is connected to ground potential. The other end of resistor R1 is connected to an end of each of resistors R2 and R3 and to one side of capacitor C2. The other side of capacitor C2 is connected to ground potential. The other end of resistor R2 and of resistor R3 through switch S1 is connected to a source of voltage E1 (shown as a battery). Voltage E1 represents the ambient temperature provided to the thermal model. Switch S1 is open when the motor is off and closed when the motor is running. Voltage source E1 is also connected to ground potential. A current proportional to power ($I^2R$), representing copper losses in the motor, is injected into the circuit at the junction of capacitor C1 and resistor R1 from a current source (not shown). Resistance R is the resistance of the windings.

Voltage V1 (representative of winding temperature) is the voltage at the junction of resistor R1 and capacitor C1 and voltage V2 (representative of iron temperature) is the voltage at the junction of resistor R1 and capacitor C2. Voltage V2 reflects the history of the motor, not actual core temperature, and thus indicates what the effect of iron on copper is. The value of voltage V2 is monitored and power to the motor is removed when the value of voltage V2 exceeds a predetermined temperature (steady-state) limit in order to ensure that the motor temperature does not exceed the steady-state temperature limit. Voltage V1 reflects the winding temperature and is monitored so that power to the motor is interrupted when the value of voltage V1 exceeds a predetermined temperature (transient) limit in order to ensure that the motor temperature does not exceed the transient temperature limit. Separate nodes having separate temperature limits for each node allow for momentary over-temperature capability of motor windings.

One end of resistor R4 is connected to the junction of resistor R1 and capacitor C1 and the other end of resistor R4 is connected to a second source of voltage E2 (shown as a battery). Voltage source E2 represents the temperature input (in volts) from a temperature sensing device imbedded in the motor and provided to the thermal model. Voltage source E2 is connected to ground potential.

Additional motor parameters which are required and are typically available from the motor manufacturer or without undue experimentation are:
(1) full load amps (FLAMPS): the highest current the motor can continuously draw without damage thereto (i.e. its rating);
(2) locked rotor current (LR): the rotor current in a stalled motor (i.e. non-rotating rotor operating at its rated input voltage);
(3) cold stall time ($t_C$): how long the motor can remain stalled without damage thereto after its rated intput voltage is applied thereto; and
(4) hot stall time ($t_H$): how long the motor can remain stalled with its rated input voltage applied thereto without damage thereto after it has been running fully loaded. (The value $t_C$ will always be greater than value $t_H$).

Typically, motor manufacturers include a safety margin in the values supplied for FLAMPS, LR, $t_C$ and $t_H$. When the thermal model of the motor is based on these data values provided by the manufacturer (to ensure guaranteed operability and applicability of warranty), it is not generally known which thermal effects are from copper and which are from iron, and thus the model may not exactly reflect the actual thermal status within the motor housing. However, the model will protect the motor in accordance with the manufacturer's recommendations.

The following parameters are defined in accordance with the present invention:
(1) short time constant ($\tau_1$): how long it takes heat to flow from copper, i.e. time to bring copper into equilibrium with iron (typical value=120 sec.);
(2) long time constant with motor running ($\tau_{2RUN}$): how long it takes for a motor operating with rated voltage input to heat up or cool off, i.e. to reach an equilibrium temperature, after a step input change in rotor current (typical value=30 min.);
(3) long time constant with motor off ($\tau_{2OFF}$): how long it takes to cool off, i.e. to reach an equilibrium temperature, after the motor has been turned off (typical value=120 min.). (Note that $\tau_{2RUN}$ is less that $\tau_{2OFF}$ due to air circulation caused by the rotating motor which circulation is lacking when the motor is turned off);
(4) RTD time constant ($\tau_{RTD}$): time required for an imbedded winding temperature measuring device to reach an equilibrium temperature after a step input change in rotor current (typical value=30 sec.); and
(5) integration time step ($\Delta t$): the time between which samples of the parameter being sampled are taken or the update time of the thermal model (typical value=0.2 sec.).

In typical motor construction, the rotor and stator core structure comprises iron. Core thermal losses are generated over a relatively large volume and, therefore, the thermal loss density is low. Core thermal mass or capacity is represented by capacitor C2. The windings of a motor comprise copper and the copper thermal losses ($I^2R$ losses) have a relatively high loss density. Copper thermal mass or capacity is represented by capacitor C1. The windings are generally situated within slots. There is insulation between the slots and the core and thus thermal resistance (represented by resistor R1) between the copper and the core. Thermal resistance between the core and ambient temperature (E1) is represented by resistor R2 when the motor is not running. When the motor is running, switch S1 closes and the thermal resistance between the core and ambient temperature (E1) is represented by the parallel combination of resistors R2 and R3. The equivalent resistance of the parallel combination of resistors R2 and R3 is less than the value of resistor R2, which is indicative of reduced thermal resistance between the core and ambient temperature when a motor is running, due in part to the cooling effect of a fan generally included as part of the structure of a motor. For motors having no fans, switch S1 would remain open or circuit elements resistor R3 and switch S1 may be removed from the circuit. The combination of resistor R3 and switch S1 permits the thermal model to more accurately reflect winding thermal conditions during cycling of the motor. Thermal resistance between a temperature sensing device imbedded in the windings and the windings themselves is represented by resistor R4.

Operation of the thermal model generates voltages V1 and V2 indicative of transient and steady-state temperature, respectively, of the motor. It must be remembered that the thermal model is generally used to prevent motor burnout or insulation failure due to overheating and not to measure or determine the specific temperature of the core or windings of the motor.

Although electrical analogs of thermal phenomena have been used to illustrate the thermal model of the present invention, it is to be understood that other analogs, such as mechanical, may also be used to represent an equivalent thermal model.

The following relationships are established based on the above-noted parameters:

$$\frac{\Delta t}{C_1} = \alpha_1 = \frac{\Delta t \cdot T_{1M}}{t_C \cdot (LR)^2}, \quad (1)$$

wherein $T_{1M}$—maximum allowable transient winding temperature;

$$\frac{\Delta t}{R_1 \cdot C_1} = \beta_{12} = \frac{\Delta t}{\tau_1}; \quad (2)$$

$$\frac{\Delta t}{R_4 \cdot C_1} = \beta_{14} = \frac{\Delta t}{\tau_{RTD}}; \quad (3)$$

$$\frac{T_{2M}}{T_{1M}} = 1 - \frac{t_H}{t_C}; \quad (4)$$

From the foregoing relationships the following generalized equation may be solved:

$$\Delta T_i = \alpha_i P_i = \sum_{j=1}^{N} \beta_{ij} \cdot (T_i - T_j), \quad (8)$$

wherein $$\alpha_i = \frac{\Delta t \cdot \frac{dT_i}{dt}}{P_i},$$

$\beta_{ij} = \Delta t / \tau_{ij}$; \quad (10)

$\tau_{ij} = C_i \cdot R_{ij}$, and $R_{ij}$ = thermal resistance between node i and node j. wherein $T_{2M}$- reflects steady-state winding temperature limit;

$$\frac{\Delta t}{R_1 \cdot C_2} = \beta_{21} = \frac{\Delta t \cdot t_C}{t_1 \cdot \tau_{2RUN}} \cdot \left(\frac{(LR)}{FLAMPS}\right)^2 \cdot \left(1 - \frac{t_H}{t_C}\right); \quad (5)$$

$$\frac{\Delta t(R_2 + R_3)}{R_2 R_3 C_2} = \beta_{23RUN} = \frac{\Delta t}{\tau_{2RUN}}; \text{ and} \quad (6)$$

$$\frac{\Delta t}{R_2 C_2} = \beta_{23OFF} = \frac{\Delta t}{\tau_{2OFF}} \quad (7)$$

Equation (8) indicates that for any node i having a thermal storage element $(C_i)$ connected directly thereto, the voltage at the node (which is indicative of temperature $T_i$) is approximately equal to $\alpha_i$ directly connected to the node times the power loss $(P_i)$ at the node minus the sum of the thermal resistance to an adjoining node (e.g. $\beta_{ij}$, i.e. from node i to node j) times temperature of node i $(T_i)$ less temperature of adjoining node j $(T_j)$ summed over all adjoining nodes (j = 1 to N), wherein $\alpha_i$ is inversely proportional to thermal capacity at node i and $\beta_{ij}$ is inversely proportional to the thermal time constant between nodes i and j. Only nodes having thermal communication therebetween will have a $\beta_{ij}$ or reciprocal time constant term.

For the thermal model of a motor shown in FIG. 1, $\alpha_1$, $\beta_{12}$, $\beta_{14}$, $\beta_{21}$, $\beta_{23RUN}$ and $\beta_{23OFF}$ are derived from motor parameters hereinbefore defined as indicated by equations (1), (2), (3), (5), (6), and (7), respectively. Equation (4) defines the steady-state trip threshold $(T_{2M})$ as a function of available motor parameters $(t_H, t_C)$. Additional $\alpha$'s and $\beta$'s may be added as desired to more nearly reflect actual operating conditions of motors having unique thermal constraints.

Figure 2:
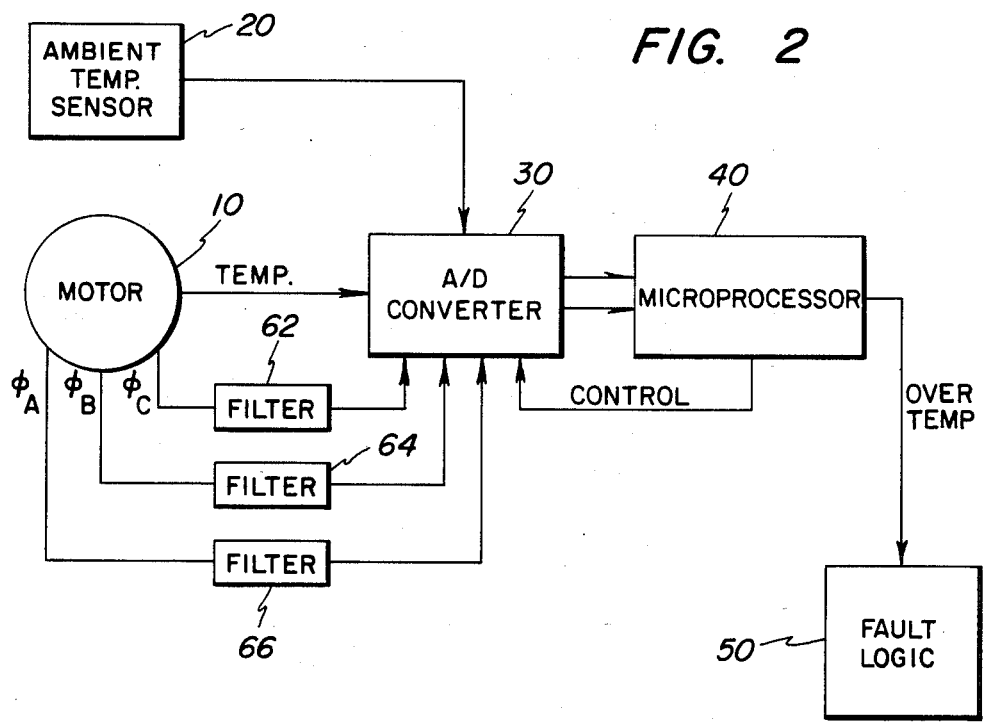
FIG. 2 is a block diagram of apparatus useful with the present invention.

Referring to FIG. 2, a block diagram of apparatus useful with the present invention is shown. A three-phase motor 10 is shown for convenience and because of its general applicability, although the invention is not limited by the number of phases of the motor. A temperature sensing device (not shown) is connected to an input of analog to digital (A/D) converter 30 and provides an indication (typically a voltage) of winding temperature of motor 10 to A/D converter 30. Three outputs from conventional monitors (not shown) of motor 10, having available signals indicative of the current in each of phases A, B and C ($\Phi_A$, $\Phi_B$, $\Phi_C$) of motor 10 are connected to inputs of respective filters 66, 64, and 62, for removing the AC component of the signal provided thereto. The output of each filter 62, 64 and 66 is connected to a respective input of A/D converter 30. The output of an ambient temperature sensor 20, which provides an indication (typically a voltage) of ambient temperature with respect to motor 10, is connected to another input of A/D converter 30. Parallel outputs from A/D converter 30 are connected to respective inputs of microprocessor 40. Microprocessor 40 may be a type 8051 integrated circuit manufactured by Intel, Inc., Santa Clara, Calif., or the like. A type 8051 integrated circuit includes a read only memory (ROM) wherein programs, such as those represented by the flow diagram of FIG. 3, may be stored. If the microprocessor selected does not include a ROM, then one may be provided as is known in the art. Microprocessor 40 may determine the average current from the individual phase currents provided thereto or may select the value of current of the phase having the highest current and then square the current chosen, as is disclosed in "Method for Overcurrent Protection", Ser. No. 373,933, filed May 3, 1982, and assigned to the instant assignee, to obtain a value for $I^2$.

An output from microprocessor 40 is connected to an input of fault logic circuitry 50, which comprises conventional components (not shown) and control circuitry (not shown) therefor, such as a relay for removing power to motor 10 when an over-temperature condition is sensed and indicators, such as lights and/or bells or sirens, for signalling an operator that an over-temperature condition exists, respectively. Another output from microprocessor 40 is connected to an input of A/D converter 30 for providing timing and synchronization control signals to A/D converter 30.

Figure 3:
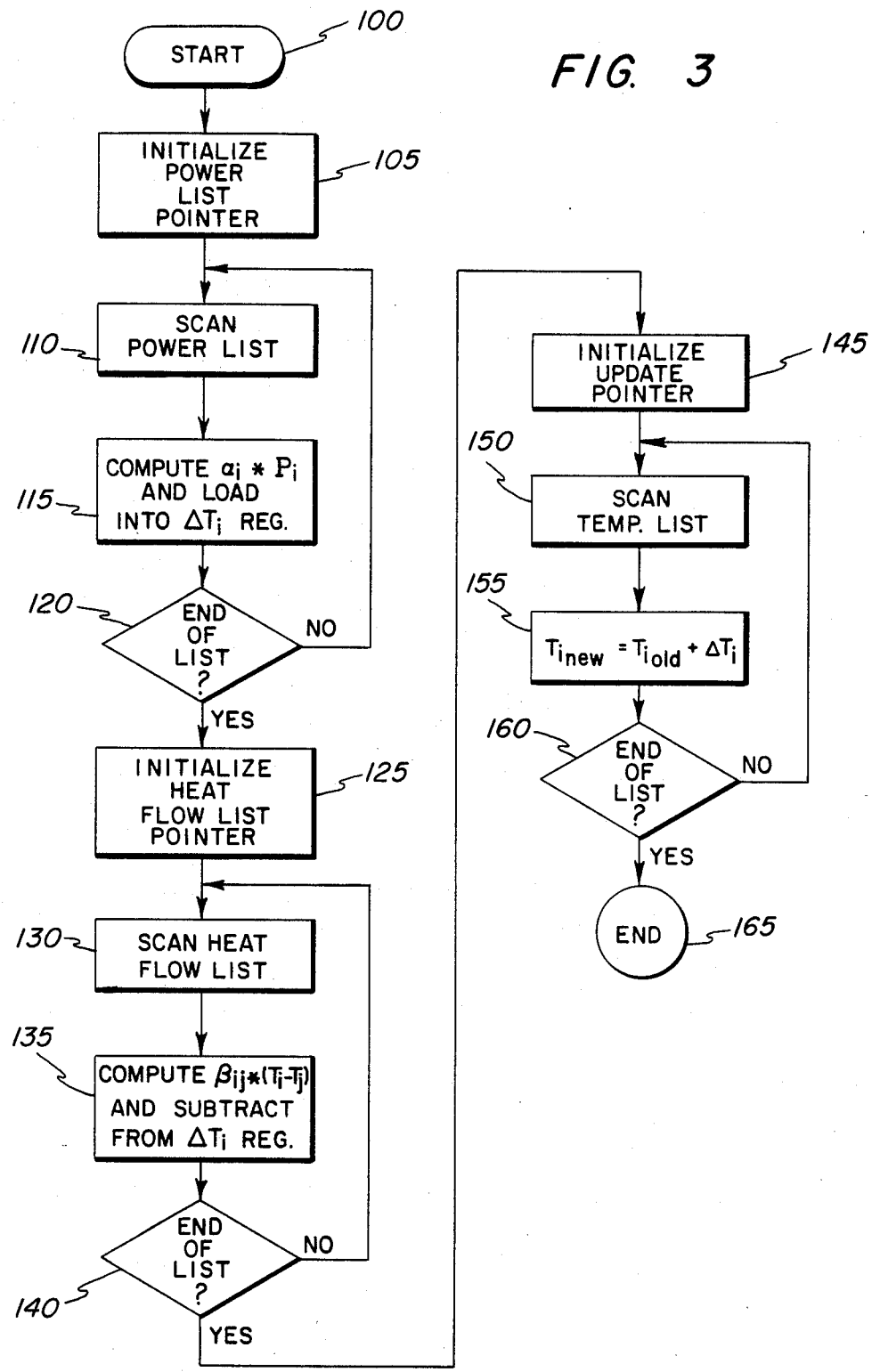
FIG. 3 is a flow diagram of a thermal model program useful with a microprocessor of the present invention.

Referring to FIG. 3, a flow diagram of thermal program, useful with a microprocessor used with the present invention, is shown. Before execution of the thermal program, parameters which are required to be used with the program, such as motor parameters typically available from the manufacturer and those defined in accordance with the present invention as hereinbefore described, must be made accessable thereto, such as by storing in a random access memory (not shown) coupled to microprocessor 40 (FIG. 2). One technique for providing such accessability is to identify the values of the parameters required and to store the values in predetermined memory locations of a random access memory (RAM) associated with the microprocessor.

The thermal program begins at step 100 and execution of step 105 initializes the power list pointer. The power list includes all power losses ($P_i$), thermal capacities ($\alpha_1$) and node temperatures ($T_i$) of the system, stored in a list having a predetermined sequence. Initialization of the power list pointer causes it to point to the first entry in the list. Execution of step 110 scans the power list and takes the next entry from the list. Execution of step 115 multiples $\alpha_i$ by $P_i$ and loads the product into a $\Delta T_i$ register or storage location. $\Delta T_i$ is the change in temperature of node i over time step $\Delta t$ due to power loss $P_i$, assuming there is no heat transfer into or out of node i during interval $\Delta t$. Execution of step 120 determines whether the end of the power list has been reached. If the end of the power list has not been reached, the program repeats steps 110-120 until execution of step 120 determines that the end of the power list has been reached at which time the program proceeds to initialize the heat flow list pointer by performing step 125.

Initialization of the heat flow list pointer causes it to point to the first entry in the list. The heat flow list includes heat transfer coefficients ($\beta_{ij}$) and pointers indicating the location of node temperatures $T_i$ and $T_j$. Execution of step 130 scans the power list and takes the next entry from the list. Execution of step 135 then multiples $\beta_{ij}$ by the difference between $T_i$ and $T_j$ and subtracts the product from the value stored in the $\Delta T_i$ register during performance of step 115. Execution of step 140 determines whether the end of the heat flow list has been reached. If the end of the flow list has not been reached, the program repeats steps 130-140. The program continues to loop through steps 130-140 until execution of step 140 determines that the end of the heat flow list has been reached at which time the program proceeds to initialize the update pointer by performing step 125. Thus, by performing steps 105-140, equation (8) is solved for all i's and j's.

Execution of step 145 initializes the update pointer, causing it to point to the first entry in the node temperature list. Execution of step 150 scans the node temperature list and selects the item ($T_{iold}$) in the list to which the update pointer is pointing. Execution of step 155 takes the value of $T_{iold}$ (stored in a predetermined location of memory), adds to it the value of $\Delta T_i$ remaining in the $\Delta T_i$ register and stores the sum in the predetermined location of memory as the value $T_{inew}$. Thus, each value $T_{inew}$ (updated value of temperature at node i) becomes the value $T_{iold}$ for the next performance of step 155 using index i. Execution of step 160 determines whether the end of the temperature list has been reached. If the end of the temperature list has not been reached, the program repeats steps 150-160. The program continues to loop through steps 150-160 until execution of step 160 determines that the end of the temperature list has been reached, at which time the program executes step 165, indicating the program has been completed. The program may be repeated by re-executing step 100. Each value $T_{inew}$ is compared in microprocessor 40 (FIG. 2) with a predetermined threshold for each node i and an over-temperature signal is supplied to fault logic 50 (FIG. 2) in order to remove power to the motor when value $T_{inew}$ exceeds the predetermined threshold for node i.

Thus has been illustrated and described, a method for simulating any real-time thermal model of a motor wherein the model may be changed, without need of hardware modifications, and may readily accommodate special applications of the motor. Further, the method provides thermal protection of induction motors without inducing nuisance tripping and accounts for a reduction in cooling when the motor is not running. Also, the method accommodates ambient and/or winding temperature measurements, and accounts for momentary over-temperature capability of motor windings.

The features of the invention believed to be novel are set forth with particularity in the appended claims. The invention itself, however, both as to organization and method of operation together with further objects and advantages thereof, may best be understood by reference to the detailed description taken in connection with the accompanying drawing.

What is claimed is:

1. A method for protecting an induction motor from excessive thermal overloads with the aid of a general purpose microprocessor, comprising:

defining an electrical thermal analog of the motor, wherein the thermal analog includes copper thermal mass (C1) of the motor, iron thermal mass (C2) of the motor, a first thermal resistance (R1) coupled between the copper (C1) and iron (C2) thermal mass, wherein node 1 is a circuit point between copper thermal mass (C1) and first thermal resistance (R1) and node 2 is a circuit point between iron thermal mass (C2) and first thermal resistance (R1), a first voltage source (E1) indicative of ambient temperature of the motor, a second thermal resistance (R2) coupled between the iron thermal mass (C2) and the first voltage source (E1), wherein node 3 is a circuit point between second thermal resistance (R2) and first voltage source (E1), a third thermal resistance (R3) and switching means for opening and closing an electrical circuit, said switching means having an input and an output, wherein said third thermal resistance (R3) is coupled between the iron thermal mass (C2) and the input of said switching means and the output of said switching means is coupled to said first voltage source, a second voltage source (E2) indicative of the temperature of the windings of the motor and a fourth thermal resistance (R4) coupled between the copper thermal mass (C1) and the second voltage source (E2), and further wherein node 4 is a circuit point between fourth thermal resistance (R4) and a second voltage source (E2), and wherein each of first (E1) and second (E2) voltage sources, copper thermal mass (C1) and iron thermal mass (C2) is referenced to the same electrical potential;

providing the microprocessor with a data base for said motor including at least:

power losses ($P_i$) within the motor for each node i of the thermal analog, and thermal time constants for the combination of each thermal mass and thermal resistance coupled directly thereto;

constantly determining ambient temperature (E1) of the motor operating environment;

constantly providing the microprocessor with said environment temperature (E1);

constantly determining temperature (E2) of the windings of the motor;

constantly providing the microprocessor with said windings temperature (E2);

repetitively calculating in the microprocessor, at predetermined intervals $\Delta t$, the following equation over all nodes i:

$$\Delta T_i = \alpha_i \cdot P_i - \sum_{j=1}^{N} \beta_{ij} \cdot (T_i - T_j),$$

wherein:
- N = number of nodes i,
- $P_i$ = power loss at node i,
- $T_i$ = temperature at node i,
- $T_j$ = temperature at node j,
- $\alpha_i = \Delta t / C_i$
- $\beta_{ij} = \Delta t / (R_{ij} \cdot C_i)$
- $\Delta T_i$ = temperature change at node i over interval $\Delta t$;

adding each calculated value of temperature change $\Delta T_i$ to a previous value of node i temperature $T_{iold}$ to create $T_{inew}$, wherein $T_{inew}$ is used as the value of $T_{iold}$ for the next interval $\Delta t$;

repetitively comparing in the microprocessor at said predetermined intervals the temperature $T_{inew}$ at node i with a predetermined temperature limit $T_{iM}$ for node i; and removing power supplied to said motor when temperature $T_{inew}$ equals or exceeds the predetermined temperature limit $T_{iM}$ for node i.

2. The method as in claim 1 wherein switch S1 is closed when the rotor of said motor is rotating and is open when the rotor of said motor is not rotating.

3. The method as in claim 1 wherein the value of first voltage source (E1) is supplied from a resistance temperature device (RTD) imbedded in the motor windings.

4. The method of claim 3 wherein the coefficient for determining heat transferred to node 1 from node 4 ($\beta_{14}$) is equal to predetermined interval $\Delta t$ divided by the thermal time constant $\tau_{RTD}$ of the RTD.

5. The method as in claim 1, wherein the coefficient for determining heat transferred to node 1 from node 2 ($\beta_{12}$) is equal to $$\Delta t / \tau_1$$

wherein $\tau_1$ is the motor short time constant.

6. The method as in claim 1 wherein the coefficient for determining heat transferred to node 2 from node 1 ($\beta_{21}$) is equal to $$\frac{\Delta t \cdot t_C}{\tau_1 \cdot \tau_{2RUN}} \cdot \left(\frac{LR}{FLAMPS}\right)^2 \cdot \left(1 - \frac{t_H}{t_C}\right)$$

wherein
- $t_C$ is the motor cold stall time;
- $t_H$ is the motor hot stall time;
- $\tau_1$ is the motor short time constant;
- $\tau_{2RUN}$ is the motor long time constant with the motor running;
- LR is the motor locked rotor current; and
- FLAMPS is the motor full load amps.

7. The method as in claim 1 wherein the coefficient for determining heat transferred to node 2 from node 3, during times that the motor is running, ($\beta_{23RUN}$) is equal to $$\frac{\Delta t}{\tau_{2RUN}},$$

wherein $\tau_{2RUN}$ is the motor long time constant with motor running.

8. The method as in claim 1 wherein the coefficient for determining heat transferred to node 2 from node 3, during times that the motor is not running, ($\beta_{23OFF}$) is equal to $$\frac{\Delta t}{\tau_{2OFF}},$$

wherein $\tau_{2OFF}$ is the motor long time constant with motor off.

9. A thermal model of an induction motor comprising:
- a first capacitor indicative of the copper thermal mass of the motor;
- a second capacitor indicative of the iron thermal mass of the motor;
- a first resistor, indicative of the thermal resistance between the iron and copper thermal masses of the motor, said first resistor coupled between one side of said first and second capacitor, respectively;
- a first voltage source, indicative of ambient temperature of the motor and a second resistor, indicative of the thermal resistance between the iron thermal mass and the ambient environment of the motor, said first voltage source having one side coupled through said second resistor to the one side of said second capacitor;
- a series combination of a third resistor and a switch, said combination coupled between the one side of said second capacitor and said first voltage source, respectively; and
- a second voltage source, indicative of winding temperature of the motor and a fourth resistor indicative of the thermal resistance between the copper thermal mass and a winding temperature sensing device, said second voltage source coupled through said fourth resistor to the one side of said first capacitor,
- wherein the other side of each said first and second voltage sources and each said first and second capacitors is connected to the same reference potential.

10. The model as in claim 9 further comprising protection means coupled to the junction of said first capacitor and said first resistor for interrupting power to the motor when voltage at the junction of said first capacitor and said first resistor exceeds a predetermined threshold.

11. The model as in claim 9 further comprising protection means coupled to the junction of said second capacitor and said first resistor for interrupting power to the motor when the voltage at the junction of said second capacitor and said first resistor exceeds a predetermined threshold.

12. The model as in claim 9 further comprising first protection means coupled to the junction of said first capacitor and said first resistor for interrupting power to the motor when voltage at the junction of said first capacitor and said first resistor exceeds a first predetermined threshold and second protection means coupled to the junction of said second capacitor and said first resistor for interrupting power to the motor when the voltage at the junction of said second capacitor and said first resistor exceeds a second predetermined threshold.

13. A method for simulating a thermal model to determine the temperature $T_i$ of each thermal mass or node $N_i$ of said model at incremental time intervals $\Delta t$, where the temperature $T_i$ of several thermal masses of said model can be measured, and wherein the heat loss $P_i$ at each node $N_i$ is known, said method being particularly suitable for implementation using a general purpose microprocessor, said method comprising the steps of:

(a) defining a reciprocal time-normalized thermal capacity $\alpha_1$ for each node $N_i$ wherein the reciprocal time-normalized thermal capacity $\alpha_i$ represents the amount of temperature rise during said time interval $\Delta t$ proportional to the heat loss $P_i$ to said node $N_i$, that is to say:

$$\alpha_i = \Delta t / C_i;$$

(b) defining a heat transfer coefficients $\beta_{ij}$ for each node $N_i$ and its adjoining nodes $N_j$ wherein each said coefficient $\beta_{ij}$ represents the proportion of heat transferred to node $N_i$ due to a temperature difference between node $N_i$ and its adjoining node $N_j$, that is to say:

$$\beta_{ij} = \Delta t / (R_{ij} \cdot C_i),$$

and wherein:

$$\beta_{ij} \text{ is not equal to } \beta_{ji};$$

(c) determining the value of said measured temperatures $T_i$ at each said interval $\Delta t$;

(d) determining the change in temperature $\Delta T_i$ of each remaining node $N_i$ at each said interval $\Delta t$ as:

$$\Delta T_i = \alpha_i \cdot P_i - \sum_{j=1}^{N} \beta_{ij} \cdot (T_i - T_j);$$

(e) determining the new temperature $T_{inew}$ of each node $N_i$ at each said interval $\Delta t$ as:

$$T_{inew} = T_i + \Delta T_i;$$

(f) revising the temperature $T_i$ of each node $N_i$ to reflect the new temperature as:

$$T_i = T_{inew}; \text{ and}$$

(g) repeating the steps (d) through (g) at each said interval $\Delta t$.

14. A method of protecting an induction motor from excessive thermal overloads with the aid of a general purpose microprocessor, comprising:

selecting an analog model of said induction motor to be simulated by said microprocessor at incremental time intervals $\Delta t$, said model including thermal masses represented by nodes $N_i$, each said thermal mass or node $N_i$ having a thermal capacity $C_i$ and power losses $P_i$, the thermal resistance between two nodes $N_i$ and $N_j$ being $R_{ij}$ wherein:

$$R_{ij} = R_{ji};$$

using said model to define a reciprocal time-normalized thermal capacity $\alpha_i$ for each node $N_i$ as:

$$\alpha_i = \Delta t / C_i;$$

wherein said model to define heat transfer coefficients $\beta_{ij}$, each representing the heat transferred to node $N_i$ from its adjoining node $N_j$, as:

$$\beta_{ij} = \Delta t / (R_{ij} \cdot C_i);$$

simulating said model to determine the temperatures $T_i$ of each node $N_i$ at each time interval $\Delta t$, said simulating step comprising the substeps of:

(a) measuring the value of several temperatures $T_i$ of certain nodes $N_i$ at each interval $\Delta t$;

(b) determining the change in temperature $\Delta T_i$ for each remaining node $N_i$ over each interval $\Delta t$, wherein:

$$\Delta T_i = \alpha_i \cdot P_i - \Sigma \beta_{ij} \cdot (T_i - T_j);$$

(c) determining the new temperature $T_{inew}$ for each node $N_i$, wherein:

$$T_{inew} = T_i + \Delta T_i;$$

(d) defining the temperature of each node at the end of each time interval $\Delta t$ as:

$$T_i = T_{inew}; \text{ and}$$

(e) comparing the temperature $T_i$ of each node $N_i$ to a predetermined temperature limit for that node, and discontinuing power to said motor if said temperature $T_i$ is greater than said predetermined limit.

* * * * *